(12) United States Patent
Alohali

(10) Patent No.: US 7,234,759 B1
(45) Date of Patent: Jun. 26, 2007

(54) MULTI-STORY HOUSE TRAILER

(76) Inventor: Amnah Alohali, Block No. 2, S.T. 3 Hous. 4, Al-Ardiyh (KW)

( * ) Notice: Subject to any disclaimer, the term of this patent is extended or adjusted under 35 U.S.C. 154(b) by 3 days.

(21) Appl. No.: 11/349,149

(22) Filed: Feb. 8, 2006

(51) Int. Cl.
*B60P 3/335* (2006.01)

(52) U.S. Cl. ............... 296/168; 296/171; 296/26.05

(58) Field of Classification Search ............ 296/168, 296/171; 280/423.1, 789
See application file for complete search history.

(56) References Cited

U.S. PATENT DOCUMENTS

| | | | | |
|---|---|---|---|---|
| 2,569,641 A * | 10/1951 | Metherell | ............ | 296/171 |
| 2,739,833 A * | 3/1956 | Schenkel et al. | ....... | 296/26.05 |
| 2,944,852 A * | 7/1960 | Snyder | ............ | 296/171 |
| 3,323,778 A * | 6/1967 | Baker | ............ | 296/26.05 |
| 3,463,541 A * | 8/1969 | Garrison | ............ | 296/164 |
| 3,506,300 A * | 4/1970 | Remmert | ............ | 296/171 |
| 3,809,426 A * | 5/1974 | Ratcliff | ............ | 296/171 |
| 3,841,691 A * | 10/1974 | Byer | ............ | 296/171 |
| 3,850,470 A * | 11/1974 | Trelle | ............ | 296/165 |
| 4,261,614 A * | 4/1981 | Rice | ............ | 296/171 |
| 4,454,613 A * | 6/1984 | Palmer | ............ | 296/171 |
| 4,508,519 A * | 4/1985 | Becker | ............ | 446/478 |
| 4,771,305 A * | 9/1988 | Potoroka | ............ | 296/24.39 |
| 5,028,088 A * | 7/1991 | Del Monico et al. | ....... | 296/165 |
| 5,129,697 A * | 7/1992 | Heikkinen | ............ | 296/165 |
| 5,374,094 A * | 12/1994 | Smith et al. | ............ | 296/171 |
| 5,769,478 A * | 6/1998 | Vernese | ............ | 296/24.31 |
| 5,967,583 A * | 10/1999 | Wishart | ............ | 296/156 |

* cited by examiner

*Primary Examiner*—Kiran B. Patel
(74) *Attorney, Agent, or Firm*—Lowe Hauptman & Berner, LLC

(57) ABSTRACT

A multi-story house trailer includes a frame, a plurality of wheels supporting said frame and a multi-story structure disposed on said frame and including a first and a top floor together with a storage floor and wherein the first and top floors have reduced ceiling height of about 100 to 120 cm and the storage floor has a height of about 40 cm. An upper deck is also provided and is accessible from the interior of the structure.

14 Claims, 3 Drawing Sheets

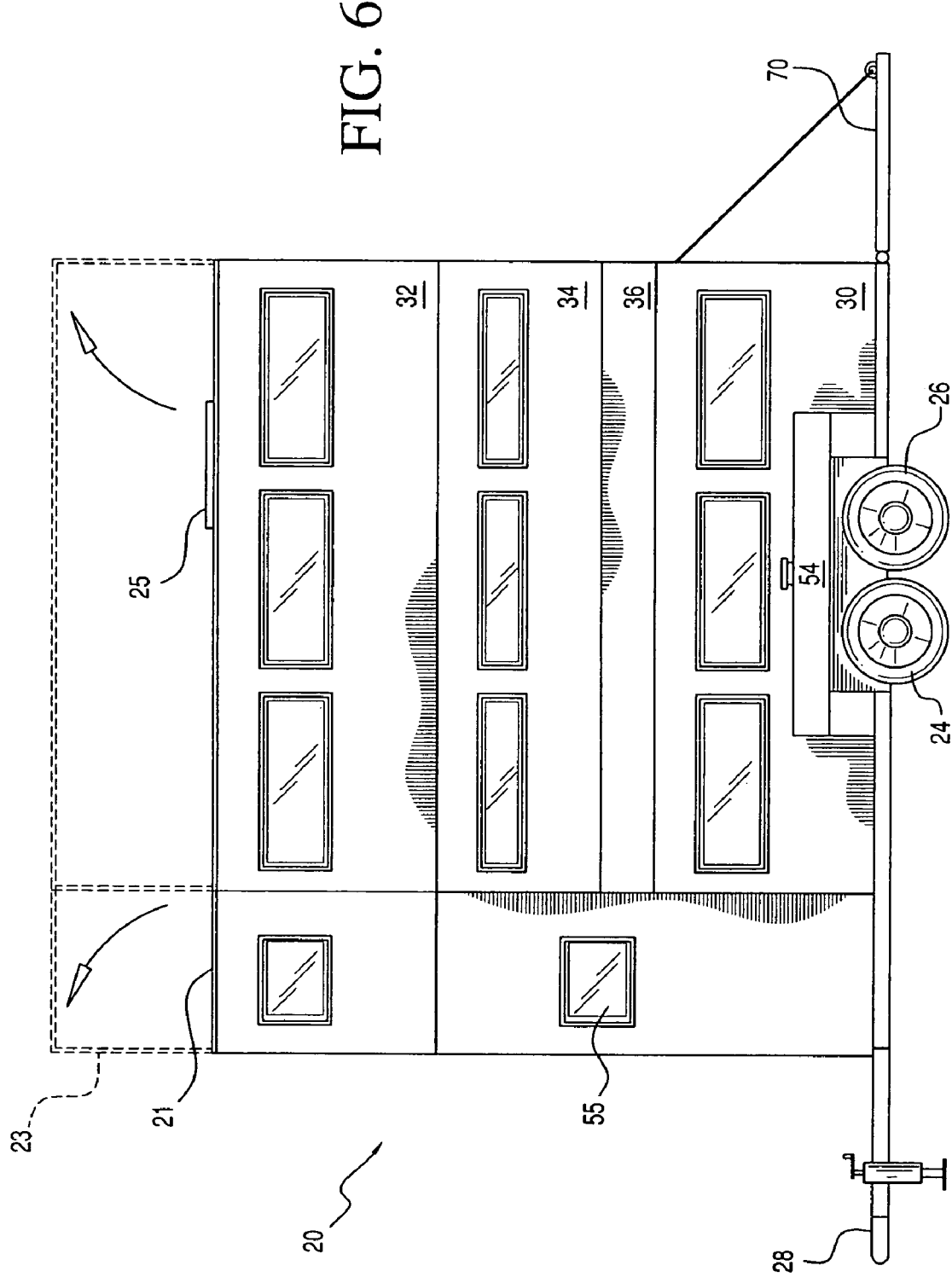

MULTI-STORY HOUSE TRAILER

FIELD OF THE INVENTION

This invention relates to a multi-story house trailer or mobile home and more particularly to a house trailer having four to five separate floors and wherein each level is of a reduced height.

BACKGROUND FOR THE INVENTION

Multi-story trailers are known. For example, a two-deck trailer is disclosed in a U.S. Pat. No. 2,589,894. As disclosed therein, a lower floor is designed with full ceiling space portions and two upstairs bedrooms off set from or staggered in respect to the downstairs full height spaces. The ceiling for the living room forms an elevated support for the bed. As disclosed the full story standing spaces beneath the lowered upstairs flooring are utilized for cabinets or closets therefore practically no space is lost and the advantages of a two-story dwelling are obtained within the objective of overall double height.

A more recent patent of Smith et al. No. 5,374,094 discloses a recreational vehicle including a lowered body and a vertically telescoping upper body. The upper body includes a second floor fully suspended when the upper body is raised and resting on stops when the upper body is lowered. A lift mechanism includes a take-up drum, lift line and pulley system to raise and lower the upper body including the upper portion of the telescopic elevator shaft while telescoping corner posts support and guide its motion. An elevator has bottom and top floors connected by vertical columns and a lift cable extending from the base of each column to top and bottom pulleys of a adjacent corner post to a power take-up drum to raise and lower the elevator. A vertically moveable bathroom is similarly provided.

A multi-story trailer or moveable dormitory in accordance with the present invention, can be used as a home away from home, a vacation home for extended families and/or workers who are housed in a relatively small space that can be moved from one location to another with minimal set up requirements. Further, the multi-story trailer in accordance with the present invention does not need the use of an elevator to raise or lower a second floor. Instead, each floor is fixed in place. Also, in view of the relatively small space, the multi-story trailer can be heated and/or cooled by a relatively small heating and cooling unit at a relatively inexpensive cost and is suitable for use in extreme weather conditions.

In addition to the above, the multi-story house trailer includes an upper deck with a collapsible railing, adequate storage space on a separate floor, a kitchen and two bathrooms as well as separate sleeping and living areas.

BRIEF SUMMARY OF THE INVENTION

In essence, the present invention contemplates a multi-story house trailer, vacation home for extended families and/or dormitory, which includes a frame and a plurality of wheels supporting the frame above the ground. The trailer also includes a tow bar fixed to the frame at one end thereof and means for supporting that end of the trailer above the ground on essentially the same distance from the ground as the frame at an opposite end thereof. A multi-story structure is disposed on top of the frame and includes at least a first floor, a top floor above the first floor and a storage floor between the first floor and the top floor.

An important feature of the present invention resides in the height of each of the floors. For example, each of the first and top floors have a height of between about 100 cm to 120 cm (39 inches to 47 inches) while the storage floor has a height of about 40 cm (about 16 inches). The trailer also includes an upper deck above the top floor, which includes a collapsible or folded down railing of about 76-91 cm (30-36 inches) or higher about its periphery. The railing reduces the likely hood of an individual falling to the ground. The railing is also folded down flat during movement of the house. This deck is preferable accessible by a closeable opening in the top floor and/or by an exterior ladder at one end of the trailer. The trailer also includes an opening between the first floor and the storage floor and between the storage floor and the top floor for access to the top floor and upper deck. The opening in the top floor for access to the upper deck is closeable for protection against inclement weather. In addition, a plurality of openings above the storage floor provides access to a plurality of storage cabinets. Further, a door for providing access to the interior of the trailer and a plurality of widows in the first and top floors provide light and/or fresh air into the structure. Finally a plurality of extendable supports extend outwardly and downwardly from the top floor to the ground for stabilizing the trailer in an upright position for habitation by one or more individuals. Such supports may also include an intermediate support extending from the support to a lower portion of the trailer.

The invention will now be described in connection with the accompanying drawings wherein like reference numerals have been used to designate like parts.

DESCRIPTION OF THE DRAWINGS

FIG. 6 is a side elevational view of a multi-story house trailer in accordance with a first embodiment of the invention.

DESCRIPTION OF THE PREFERRED EMBODIMENTS OF THE INVENTION

Figure 1:
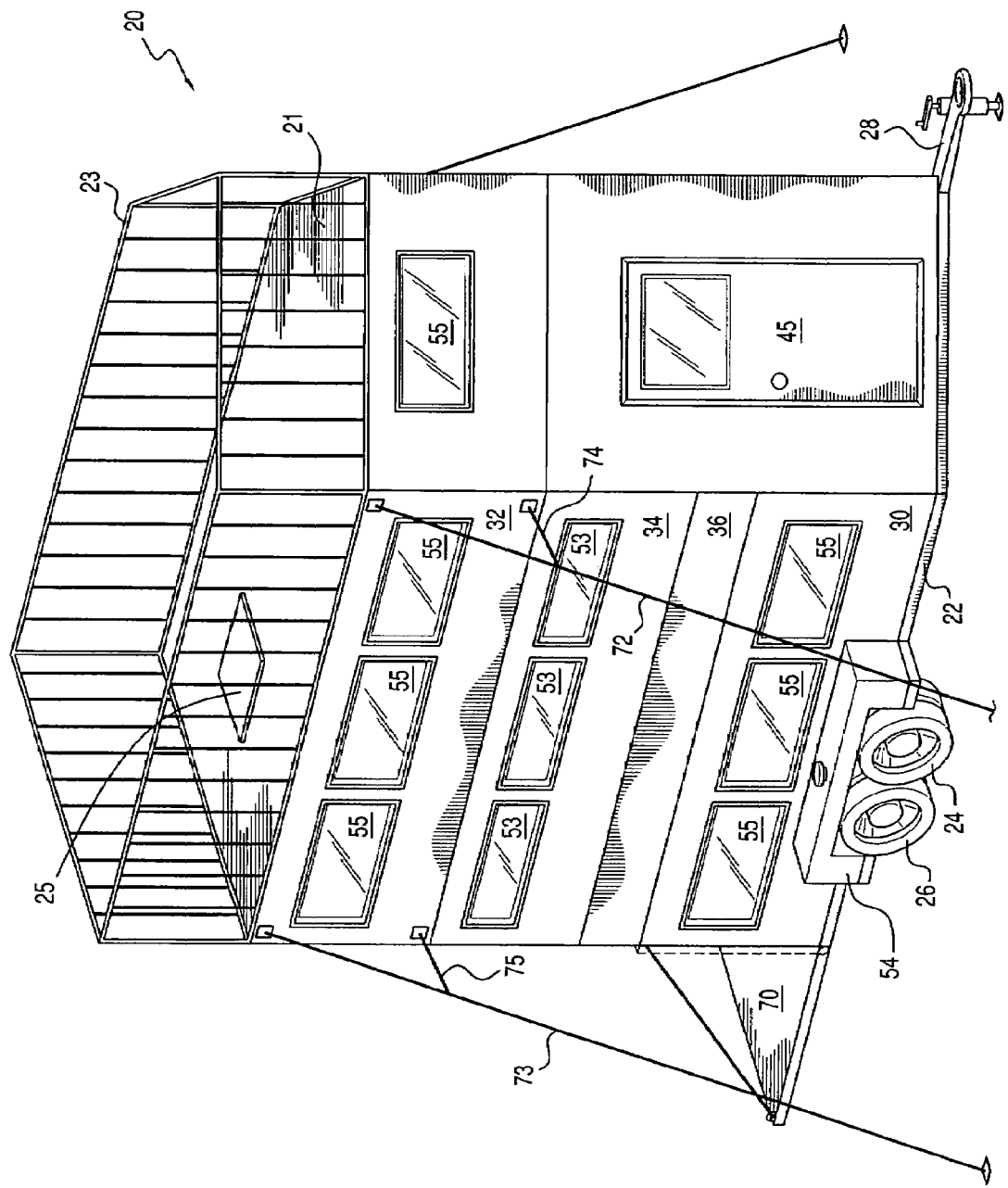
FIG. 1 is a perspective view of a multi-story house trailer in accordance with the first embodiment of the invention.

A multi-story house trailer 20 in accordance with one embodiment of the invention is shown in FIG. 1. As shown, the multi-story trailer 20 may be used as a vacation home for extended families and/or a dormitory for a group of workers. The trailer 20 includes a frame 22 of a conventional design to support the weight and size of the trailer during occupancy and transportation from one location to another. In it's preferred form, the trailer has a shape of a pentagon and is supported by a tandum axles with dual wheels 24 and 26 on each side of each axle. The trailer 20 also includes a conventional tow bar 28 for attachment to a suitable motor vehicle (not shown) for moving the trailer from one location to another.

Figure 2:
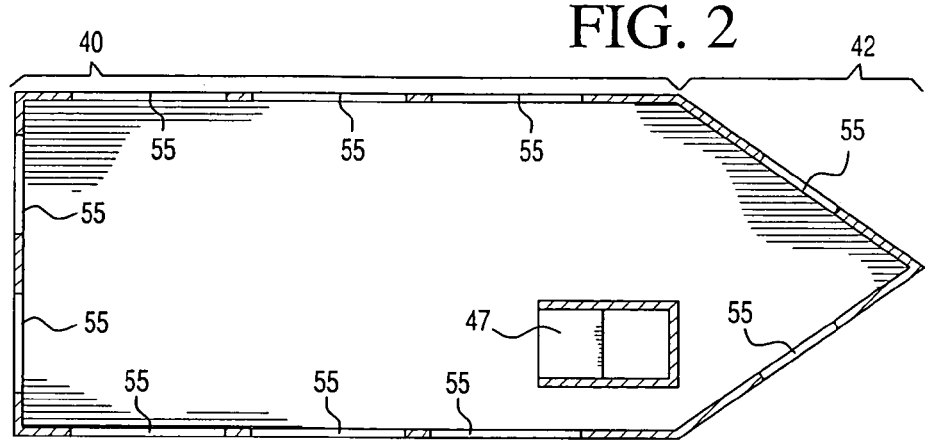
FIG. 2 is a top or plan view of a first floor of the multi-story trailer in accordance with the first embodiment of the invention.
Figure 5:
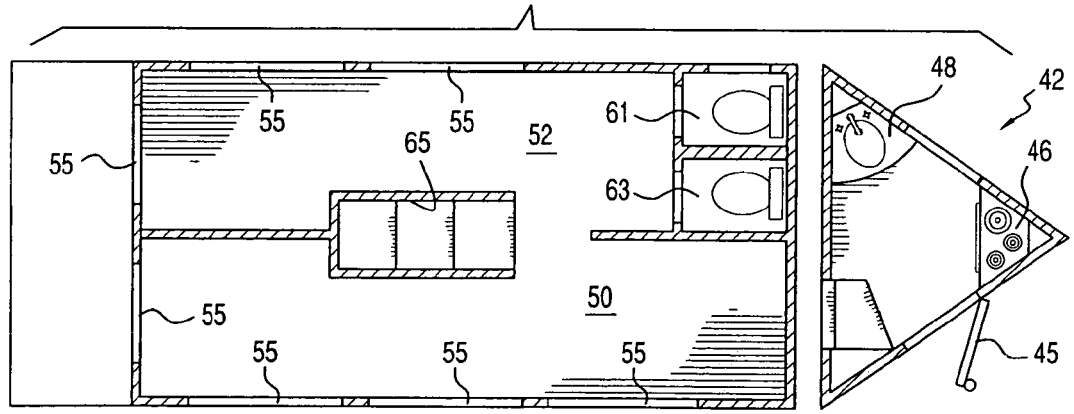
FIG. 5 is top or plan view of a top floor of a multi-story house trailer in accordance with a second embodiment of the invention.

As shown in FIGS. 1 and 6, the multi-story house trailer 20 includes four floors 30, 32, 34 and 36 and an open upper deck 21 having a collapsible railing 23 extending around it's outer periphery. The first or lower floor 30 may incorporate general living quarters as shown in FIG. 2 or may be divided into a living area 50 and sleeping area 52 as shown in FIG. 5. The lower floor 30, upper floor 32 and intermediate floor 34 each have a height of between about 100 cm to 120 cm (about 39 inches to about 47 inches). The height allows an individual to sit comfortable on the floor with pillows or back rests for comfort and at the same time to move about without standing. The upper floor 32 and intermediate floor 34 have similar heights and may be divided for living and sleeping areas or dedicated for sleeping depending on the preference of a designer or owner.

An important feature of the present invention resides in the use of a storage floor 36 located between the lower floor 30 and upper floor 32. The storage floor is located between the lower floor 30 and intermediate floor 34 or between the intermediate floor 34 and upper floor 32 and has a height of about 40 cm (16 inches) and is generally free of outside windows and doors. Access to the storage floor is generally from the floor immediately above it. Nevertheless, it is contemplated that access from the outside may be provided.

A closeable waterproof hatch assembly 25 provides access to the upper deck 21 through the upper floor 32. The upper deck may also be outfitted with a tent (not shown) for additional sleeping quarters or to provide shade to reduce the load on an air-conditioning unit (not shown). In a preferred embodiment of the invention, the multi-story house trailer 20 has an overall shape of a pentagon with a generally rectangular shaped rear portion 40 and a generally triangular shaped forward portion 42 as shown more clearly in FIG. 2. The forward portion includes a door 45 (FIGS. 1, 2, 5, and 6). As illustrated in FIGS. 1 and 6, it is contemplated that this forward portion 42 has sufficient height for standing and includes a kitchen area 46 and bathroom 48 (shown in FIG. 5). The forward portion 42 may also include a window 55 for added lighting and air circulation. The forward area also includes a door 57 which provides direct access to the lower floor 30 and intermediate floor 34.

As illustrated in FIG. 2 the lower floor can be used as a living area while the upper floor 32 would be entirely dedicated to sleeping area with access to the intermediate floor by a hatch like opening 47.

As shown in FIGS. 1 and 6, the trailer preferably includes an extendable support means such as a pair of extendable poles for providing support against being upended by the wind when occupied. For example, a pair of downwardly extending rod like supports 72 and 73 brace the trailer on each side thereof. These supports may also be reinforced by cross supports 74 and 75 or the like.

Figure 4:
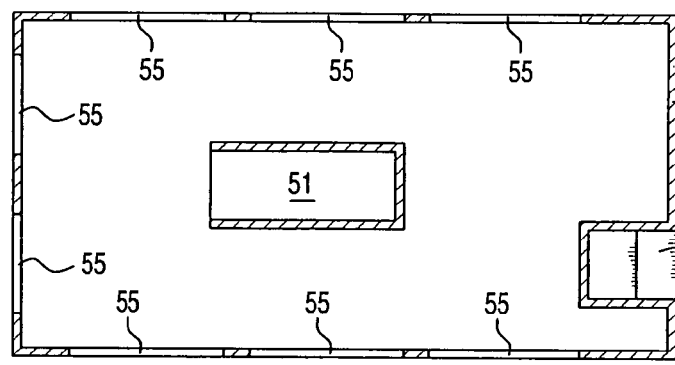
FIG. 4 is a perspective view of a multi-story house trailer in accordance with a second embodiment of the invention.
Figure 3:
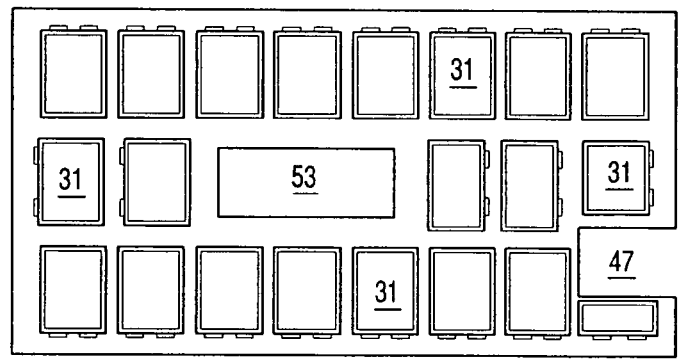
FIG. 3 is a perspective view of a storage floor of a multi-story trailer in accordance with one embodiment of the invention.

The intermediate floor 34 may have a generally rectangular cross-section as shown in FIG. 4 and includes a wall 49, which separates it from a standup forward portion 42. This intermediate portion 42 also includes an opening 47 for access to the floor from the forward position and a central opening 51 for access to the upper floor 32 and upper deck 21. Windows 55 are also provided in the intermediate floor 34.

The storage floor 34 includes a plurality of separate cabinets 31 which are accessible from the floor immediately above the cabinets. The storage floor also includes an opening 47' and an extension of the wall 49 separating it from the forward portion 42. A central opening 53 is also provided for access to the intermediate floor 34 from the first or lower floor 30.

As illustrated in FIG. 5, one or more floors can be divided into a living area 50 and sleeping area 52. However, it is also contemplated that the lower floor 30 may also include two bathrooms 61 and 63. These bathrooms may include chemical toilets, which are accessible from the outside of the trailer for emptying, or other conventional toilets as used in recreational vehicles. It is also contemplated that the lower floor 30 serve as a living area with the upper intermediate areas dedicated to sleeping. As illustrated in FIG. 5, the first and/or upper floors 30 and 32 respectively include a plurality of windows 55. An opening 65 is also provided for access to the intermediate floor 34 and ultimately to the deck 21.

As shown in FIG. 5 the forward triangular shaped portion including the kitchen area 46 and toilet 48 can be provided in a separate vehicle that can be moved independently and subsequently attached to the rear rectangular section with a door or opening between the two to gain access to the two sections.

In addition to the above, the trailer 20 includes a pair of water tanks 54 (only one shown in FIG. 1 and a second one shown in FIG. 6). As illustrated, the water tanks are shown over the wheels 24 and 26 and on the outside of the structure. Nevertheless, the water tanks can be relocated inboard or moved to another location. They are preferably placed over the tandum axles and dual wheels since the 250 gallons in each tank amount to about two tons.

Finally, the trailer 20 in accordance with a preferred embodiment of the invention includes a foldable rear deck 70 that extends rearwardly from the back of the trailer 20 and may be attached to the frame 22. This deck 70 as well as the frame 22 are maintained in horizontal plane by an adjustable support 72 or other conventional means as used in recreational vehicles.

While the invention has been described in connection with its preferred embodiments it should be recognized that changes and modifications may be made therein without departing from the scope of the appended claims.

What is claimed is:

1. A multi-story house trailer comprising:
    a frame;
    a plurality of wheels supporting said frame above the ground and a tow bar fixed to said frame at one end thereof for moving said trailer from one place to another;
    a multi-story structure disposed on said frame and including a first floor, a top floor above said first floor and a storage floor between said first floor and said top floor and each of said first floor and said top floor having a height of about 100 cm to 120 cm (39 inches to 47 inches), and said storage floor having a height of about 40 cm (about 16 inches), and an upper deck above said top floor and a collapsible railing around an outer periphery of said deck;
    a plurality of openings in said first floor, said storage floor and said top floor for providing access to said top floor and said deck from said first floor;
    a door in said first floor for gaining access to an interior of said trailer and a plurality of windows in said first and said top floors; and
    a plurality of extendable supports extending outwardly and downwardly from said top floor to the ground for stabilizing said trailer in an upright position for inhabitation by one or more individuals and a closable opening in between said upper floor and said deck.

2. A multi-story house trailer according to claim 1 which includes an intermediate floor having a height of about 100 to 120 cm disposed between said first floor and said top floor and wherein said intermediate floor defines openings to allow access to said top floor from said first floor.

3. A multi-story house trailer according to claim 2 which includes four reinforcing supports connected to said extendable supports.

4. A multi-story house trailer according to claim 3 in which each of said floors are in the shape of a pentagon.

5. A multi-story house trailer according to claim 4 in which said trailer includes two water tanks disposed on the level of said first floor above said frame.

6. A multi-story house trailer according to claim 5, which includes a pair of tandum axles.

7. A multi-story house trailer according to claim 6 which includes dual wheels at each end of each axle.

8. A multi-story house trailer according to claim 7 in which said storage floor is divided into a plurality of compartments.

9. A multi-story house trailer according to claim 8, which includes a moveable balcony and wherein said balcony is foldable upwardly for movement of said trailer.

10. A multi-story house trailer according to claim 9 which includes a kitchen in a forward portion thereof.

11. A multi-story house trailer according to claim 10 which includes a bathroom.

12. A multi-story house trailer according to claim 11 which includes two bathrooms.

13. A multi-story house trailer according to claim 1 which includes a tent on said deck.

14. A multi-story house trailer according to claim 12 which includes means for leveling said trailer.

* * * * *